United States Patent [19]

Weber

[11] 4,183,215
[45] Jan. 15, 1980

[54] PEDAL LINKAGE HYDRAULIC BRAKE BOOSTER

[75] Inventor: Arthur C. Weber, Utica, Mich.

[73] Assignee: The United States of America as represented by the Secretary of the Army, Washington, D.C.

[21] Appl. No.: 818,177

[22] Filed: Jul. 22, 1977

[51] Int. Cl.² .......................................... B60T 13/12
[52] U.S. Cl. .................................. 60/547 R; 60/581; 91/216 A; 91/378; 91/391 R
[58] Field of Search ................ 60/547, 548, 567, 581, 60/593; 91/216 A, 216 R, 378, 391 R

[56] References Cited

U.S. PATENT DOCUMENTS

| | | | |
|---|---|---|---|
| 3,175,471 | 3/1965 | Randol | 91/216 R |
| 3,208,357 | 9/1965 | Allen | 92/146 |
| 3,295,420 | 1/1967 | Gleason | 91/216 R |
| 3,321,915 | 5/1967 | Martin | 91/216 R |
| 3,354,788 | 11/1967 | Garrison | 91/378 |
| 3,892,164 | 7/1975 | Magor | 91/378 |

Primary Examiner—Abraham Hershkovitz
Attorney, Agent, or Firm—Peter A. Taucher; John E. McRae; Nathan Edelberg

[57] ABSTRACT

A conventional hydraulic braking system using a master cylinder and a force booster means between the brake pedal and master piston. The force booster means comprises a liquid cylinder and control valve means for selectively communicating the cylinder with a hydraulic pressure source or drain, depending on the application or non-application of manual force to the brake pedal. The control valve is designed to regulate the cylinder movement in accordance with pedal movement while increasing the force applied to the master piston.

1 Claim, 4 Drawing Figures

PEDAL LINKAGE HYDRAULIC BRAKE BOOSTER

The invention described herein may be manufactured, used, and licensed by or for the Government for governmental purposes without payment to me of any royalty thereon.

BACKGROUND AND SUMMARY OF THE INVENTION

There are in existence power braking systems wherein engine vacuum is applied to a diaphragm associated with the piston of a master cylinder or the brake pedal (different types of systems). The present invention relates to a force booster that utilizes energy from external hydraulic pressure source in lieu of engine vacuum. Objects of the present invention are to provide a force booster that (1) is relatively compact, (2) that utilizes axial forces for minimizing side thrust and wear, (3) that is capable of use with conventional master cylinders, (4) that requires a minimum number of external connections to the hydraulic pressure source, and (5) that has a fail-safe operation in event of loss of hydraulic pressure.

THE DRAWINGS

Figure 1:
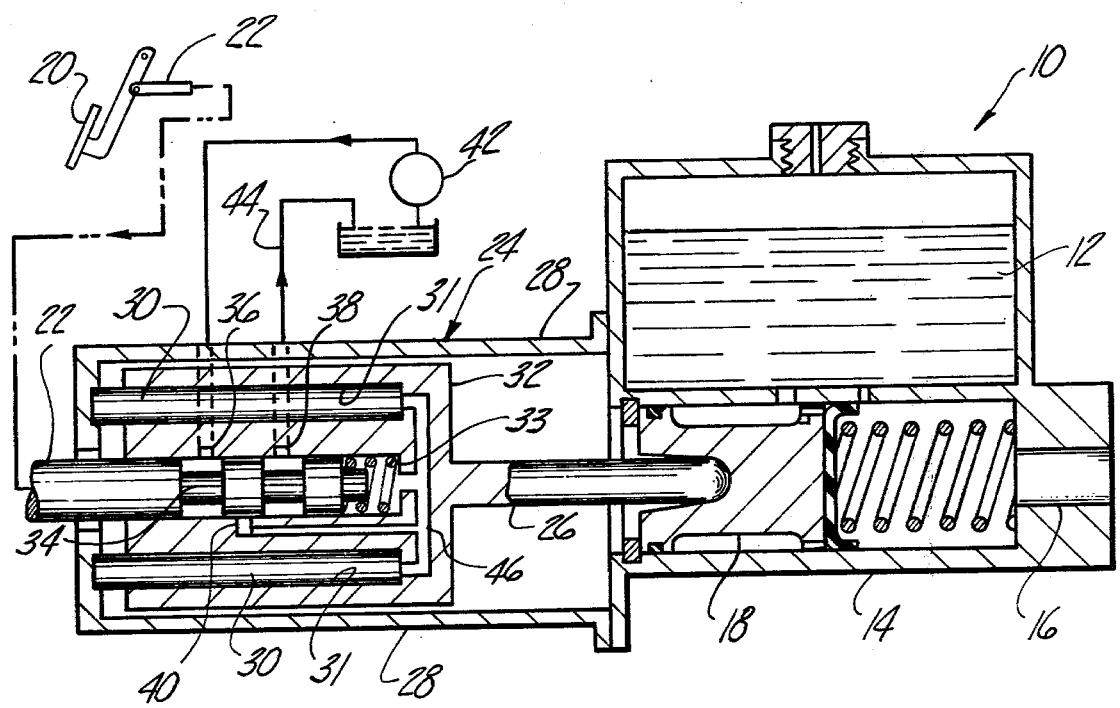
FIG. 1 is a sectional view taken through one embodiment of the invention with the master piston in a retracted depressurized condition.

Referring to FIG. 1 of the drawings, there is shown part of a conventional vehicle braking system that includes a conventional master cylinder 10 defining a hydraulic reservoir 12 located above the cylinder 14. Opening 16 in the right end wall of the cylinder connects with conventional piping (not shown) leading to the wheel cylinders. A slidable master piston 18 moves rightwardly to pressurize the system liquid and thereby actuate the wheel cylinders in normal brake operation. Rightward movement of the master piston 18 is initially obtained by depression of a conventional brake pedal 20 that is operatively connected to a rod 22. As the pedal is manually depressed rod 22 is moved slightly to the right to actuate a hydraulic force booster means designated by numeral 24. The force booster means includes hydraulic cylinders that receive pressure fluid from an external pressure source, e.g. the vehicle oil pump or accumulator, to magnify the force applied through push rod 26 to the master piston 18.

The force booster means 24 is shown to include a stationary support 28 bolted or otherwise secured to master cylinder 10. Extending from the left end wall of support 28 are two stationary pistons 30 that telescope into cylindrical bores 31 in a movable housing 32. While two stationary pistons 30 are shown, any number of pistons can be used; balancing considerations suggest three pistons circumferentially spaced at 120 degree intervals around the rod 22 axis. The aforementioned rod 22 includes a shuttle spool valve element 34 located within a cylindrical valve chamber in the movable housing. The land and groove areas of the spool valve register or communicate with a pressure port 36, a drain port 38, and a liquid utilization port 40 located at different axial dispositions in housing 32. Port 36 continuously communicates with a pump 42 or other liquid pressure source, whereas port 38 continuously communicates with a drain line 44. Port 40 communicates with the right ends of the stationary pistons 30 via an internal passage system designated generally by numeral 46.

Since housing 32 is a movable component the passage system between pump 42 and port 36 should include an external flexible hydraulic hose; similarly the drain line 44 should include a flexible hydraulic hose. Stationary support 28 should be slotted or otherwise configured to avoid interference with the hoses at the points where they connect with movable housing 32.

Figure 2:
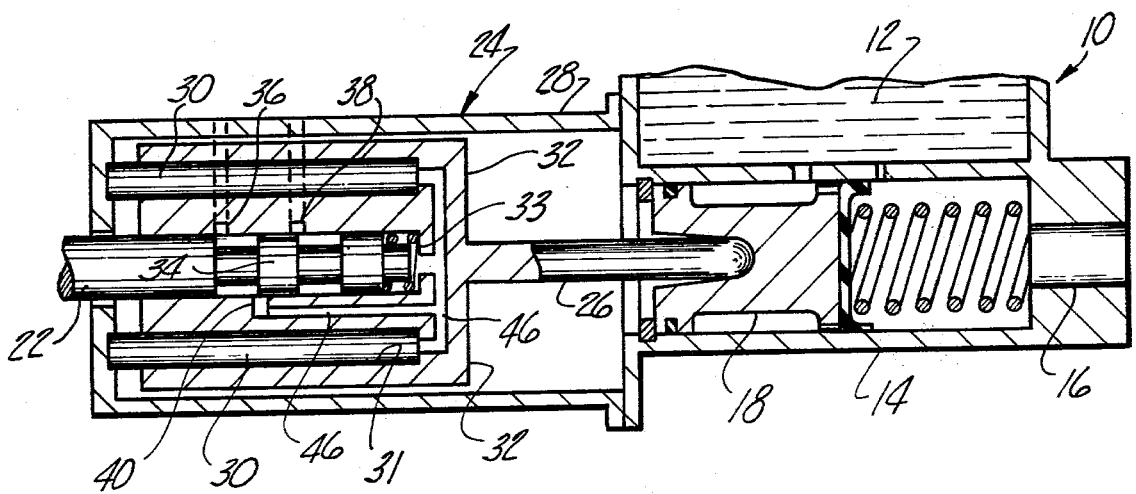
FIG. 2 is a sectional view similar to FIG. 1, but just after depression of the brake pedal.
Figure 3:
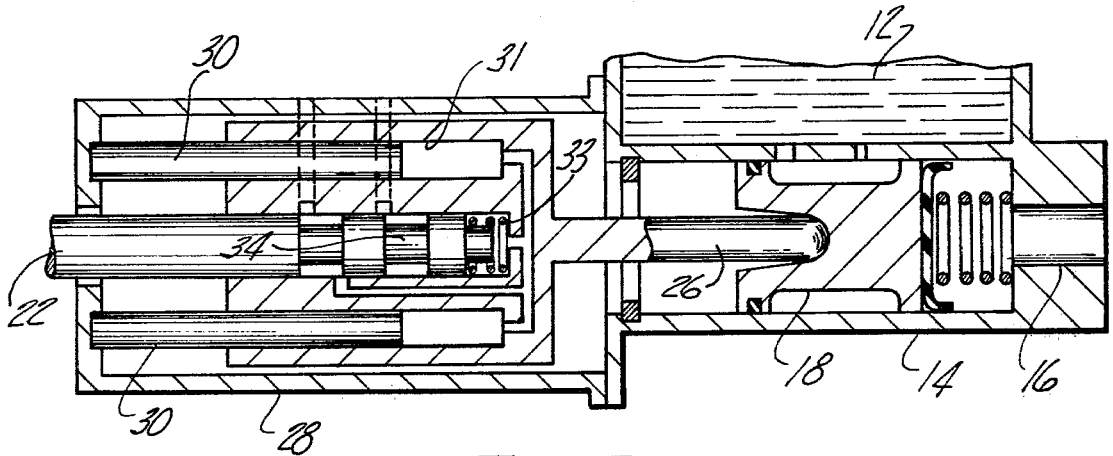
FIG. 3 is a view similar to FIG. 1, but with the master piston fully extended to pressurize the braking system fluid.

FIG. 1 illustrates the system when no manual force is applied to pedal 20; the land area of spool valve 34 seals utilization port 40 from the pressure port 36 so that booster cylinders 31 are depressurized. As the pedal 20 is manually depressed the rod 22 moves a slight distance to the right (as shown in FIG. 2) so that the leftmost groove in spool valve 34 communicates pressure port 36 with utilization port 40. Pressure liquid from source 42 is thereby permitted to flow into passage system 46, to thus pressurize cylinders 31 and move the housing 32 to the right. As housing 32 moves a short distance it incrementally closes utilization port 40, thereby tending to reduce the extent of pressurization of cylinders 31. Meanwhile the manual pressure on the pedal 20 continues to move rod 22 to the right, thereby reestablishing the fluid connection between pressure port 36 and utilization port 40. The result is a repressurization, or actually a continued pressurization, of the cylinders 31. The movable housing 32 and actuator rod 22 thereby move as a unit to the FIG. 3 brake-actuated position.

Figure 4:
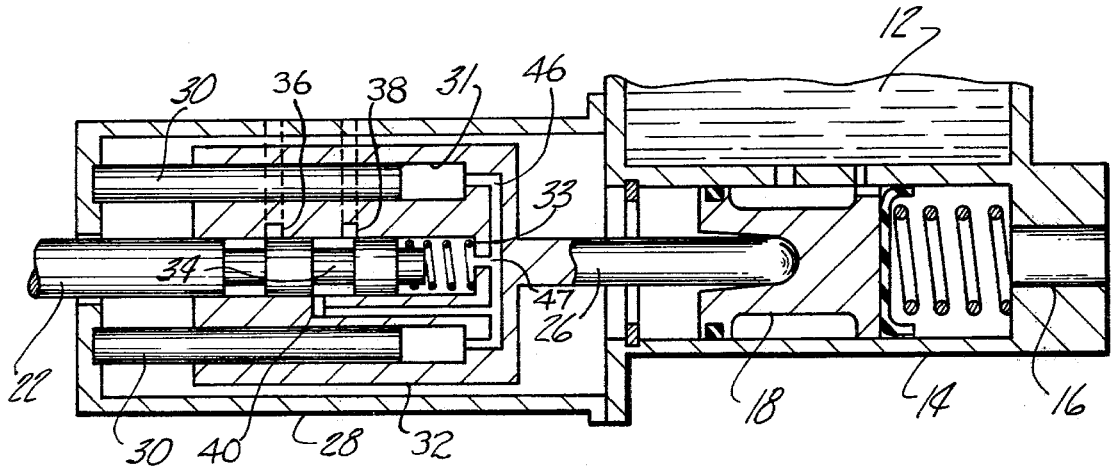
FIG. 4 is a sectional view similar to FIG. 3, but just after release of manual pressure on the brake pedal.

After completion of the braking operation the driver of the vehicle releases the manual force on pedal 20 so that rod 22 moves slightly to the left to the FIG. 4 position; this leftward movement of rod 22 occurs primarily because the liquid pressure in passage system 46 exerts an unrestrained or unopposed force through a liquid relief passageway 47, thence onto the right end of spool valve 34. As the spool valve assumes the FIG. 4 position the right groove in valve 34 communicates the pressure utilization port 40 with the drain port 38, thereby depressurizing the cylinders 31 and permitting housing 32 to move leftwardly to the FIG. 1 position. The impetus for this movement is provided by the system pressure on the right face of master piston 18. As the housing 32 nears the FIG. 1 position the housing slightly overtakes the rod 22 to position the land area of valve 34 over the port 40.

The illustrated system includes a fail-safe feature which prevents loss of braking pressure in the event that pump 42 should fail to deliver pressure liquid to port 36 while the pedal 20 is being depressed. The fail-safe feature comprises a stop surface 33 formed within housing 32 in alignment with valve element 34. The stop surface is located so that if port 36 fails to receive pressure liquid the rod 22 will continue its rightward motion (in FIG. 2) to forcibly strike surface 33 and mechanically move housing 32 to the FIG. 3 position. The spring shown between valve element 34 and surface 33 is optional; its purpose (when used) is to increase the initial manual pedal effort force required for actuation of the brake system should that be a requirement imposed on the system.

The structure of FIGS. 1 through 4 is believed to be of a compact nature requiring minimum space for incorporating the power boost function into a conventional braking system. The adaption of the add-on force booster to the system is also made easier because only two external connections need to be made to the pressure source and drain line. Preferably the force booster is constructed to include a plurality of stationary pistons 30 located equidistant from the central axis of the master piston 18. The space within housing 32 on its axis is utilized for the shuttle valve 34, thereby providing a relatively compact structure, while still obtaining a balanced straight line force connection between rod 22 and master piston 18 (even though pistons 30 are offset from this axis).

I wish it to be understood that I do not desire to be limited to the exact details of construction shown and described for obvious modifications will occur to a person skilled in the art.

I claim:

1. In a vehicle braking system comprising a master cylinder equipped with a master piston for applying braking pressure on hydraulic brake fluid within the system, and a pedal operator operationally connected to said master piston for moving same in the pressure-increase direction when a manual force is applied to the pedal;

the improvement comprising hydraulic force booster means operatively interposed between the pedal and master piston for increasing the actuator force on said piston when the pedal operator is moved in the pressure-increase direction;

said force booster means comprising a first movable push rod (22) operationally connected to the pedal for movement along the rod axis; a movable housing (32) slidably disposed on the first push rod, said movable housing including a second push rod (26) axially aligned with the first rod and the master piston for applying a straight line operating force to said piston; a plurality of stationary force-booster pistons (30) grouped around the push rod axis in parallel non-coaxial relationship, each stationary piston extending into a bore (31) in the movable housing whereby hydraulic forces within the bores cause the housing to move axially for applying the desired operating force to the master piston;

said first push rod having two axially spaced grooves in its outer surface, the grooves being separated by a land and constituting a shuttle valve element for alternately pressurizing or depressurizing the movable housing bores; the movable housing having a first internal pressure port (36) connected to an external hydraulic pressure source, an internal drain port (38) connected to an external drain line, an internal liquid utilization port (40), and an internal passage means (46) connecting the utilization port with each of the aforementioned bores (31); the aforementioned grooves and ports being oriented so that when the housing is telescoped outwardly on the first push rod one of the grooves communicates the pressure port with the utilization port, and when the housing is telescoped inwardly on the first push rod the other groove communicates the drain port with the utilization port;

the movable housing having an internal stop surface (33) that contacts an end of the first push rod when the pedal is moved in the pressure-increase direction and the aforementioned bores (31) are depressurized;

the movable housing having an internal passage (47) communicating the aforementioned passage means (46) with the end of the first push rod, whereby an axial hydraulic force is transmitted to the first rod.

* * * * *